(12) United States Patent
Basir et al.

(10) Patent No.: US 7,088,113 B2
(45) Date of Patent: Aug. 8, 2006

(54) INTEGRATED OCCUPANT SENSORY SYSTEM

(75) Inventors: Otman A. Basir, Waterloo (CA); Brian Johnson, Waterloo (CA); Kristopher Desrochers, Kitchener (CA); Fakhreddine Karray, Waterloo (CA)

(73) Assignee: Intelligent Mechatronic Systems Inc. (CA)

( * ) Notice: Subject to any disclaimer, the term of this patent is extended or adjusted under 35 U.S.C. 154(b) by 192 days.

(21) Appl. No.: 10/615,581

(22) Filed: Jul. 8, 2003

(65) Prior Publication Data

US 2004/0075444 A1   Apr. 22, 2004

Related U.S. Application Data

(60) Provisional application No. 60/394,470, filed on Jul. 8, 2002.

(51) Int. Cl.
*G01R 27/16* (2006.01)
*B60R 21/16* (2006.01)

(52) U.S. Cl. .................... 324/663; 701/45; 280/735
(58) Field of Classification Search ........ 324/661–663, 324/671, 686; 280/735; 701/45
See application file for complete search history.

(56) References Cited

U.S. PATENT DOCUMENTS

| | | | |
|---|---|---|---|
| 5,525,843 A * | 6/1996 | Howing ..................... 307/9.1 |
| 5,573,269 A | 11/1996 | Gentry et al. |
| 5,624,132 A | 4/1997 | Blackburn et al. |
| 5,626,359 A | 5/1997 | Steffens, Jr. et al. |
| 6,043,736 A | 3/2000 | Sawahata et al. |
| 6,056,079 A | 5/2000 | Cech et al. |
| 6,087,598 A | 7/2000 | Munch |
| 6,345,839 B1 | 2/2002 | Kuboki et al. |
| 6,412,813 B1 * | 7/2002 | Breed et al. ................. 280/735 |
| 6,646,452 B1 * | 11/2003 | Lester ......................... 324/661 |
| 6,678,600 B1 * | 1/2004 | Basir et al. .................... 701/45 |
| 6,703,845 B1 * | 3/2004 | Stanley et al. .............. 324/663 |
| 6,801,662 B1 * | 10/2004 | Owechko et al. ........... 382/224 |
| 2002/0011722 A1 | 1/2002 | Winkler et al. |
| 2002/0050924 A1 * | 5/2002 | Mahbub ...................... 340/426 |
| 2003/0040858 A1 * | 2/2003 | Wallace ......................... 701/45 |
| 2005/0269810 A1 * | 12/2005 | Breed et al. ................. 280/735 |

FOREIGN PATENT DOCUMENTS

WO    WO 97/39920        10/1997
WO    WO 02/25229 A1     3/2002

* cited by examiner

*Primary Examiner*—Anjan Deb
(74) *Attorney, Agent, or Firm*—Carlson, Gaskey & Olds

(57) ABSTRACT

This invention describes (i) an occupant classification, (ii) a baby seat detection, and (iii) an integrated occupant sensory system. The main goal of the invention is to provide the vehicle's restraint device(s) with enough information about the vehicle's occupant as to take the most appropriate actions necessary for the safety of the occupant. This invention (or some sub-modules of it) does not have to be restricted to the use in automotive restraint systems as it may be used in several other applications as well.

25 Claims, 6 Drawing Sheets

INTEGRATED OCCUPANT SENSORY SYSTEM

This application claims priority to U.S. Provisional Application Ser. No. 60/394,470 filed Jul. 8, 2002.

BACKGROUND OF THE INVENTION

The present invention is mainly directed to an occupant classification and weight sensory system.

Vehicle occupant protection systems, which are activated in response to a vehicle crash for those people of mitigating occupant injury, are well known in the art. A vehicle may contain automatic safety restraint actuators such as front and side air bags, seat belt pretensioners, and deployable knee bolsters. The occupant protection system may further include a collision/crash sensor for sensing the occurrence of a vehicle crash and for providing an electrical signal indicative of the crash severity.

Several known occupant protection systems include an occupant classification or weight detection system. The occupant classification/weight detection system could consist of occupant weight or size determination based on force/load sensors, capacitive/electric sensors, resistive load distribution sensors, ultrasonic sensors, infrared sensors, and/or image based sensors. A controller, which is connected to one or a combination of these sensors, controls the inflatable protection module in accordance to the sensed size or weight of the occupant. In response to the sensed occupant weight or size, one or more deployment aspects of the restraint system, such as the air bag, may be adjusted. A protection system with adjustable aspects of deployment is commonly referred to as an "adaptive" protection system. Specifically, if the occupant is so small or light that deploying the air bag will not enhance protection of the occupant, it may be desirable to suppress the activation of the occupant protection module. In such a case, air bag deployment may even be more detrimental than no deployment at all.

Occupant classification and weight estimation are key components of adaptive occupant protection systems. There are several types of such systems but many of them suffer from serious shortcomings. A system that classifies an occupant based on the strength of an electric field (or the capacitance of the human body) may be misled if a minimum contact surface area between the occupant and the sensor is not reached, for instance. A system that classifies the occupant based on the load distribution, size, shape and/or orientation of the occupant's posteriors may not be reliable as people come in varying heights, weights and body shapes and sizes. A system that relies solely on force/load sensors cannot account for false readings due to external forces such as accelerations or information loss due to body angle or foot position. Different obstacles such as a map, a book, a newspaper, or a mirror, for instance, could occlude signals from ultrasonic and video based systems. Also, a lighter or a cigarette could blind an infrared-based system.

This invention is based on a simple fact—in an occupant classification or weight detection system, false readings due to external forces and losses of information due to body angle and foot position can be compensated for, if these factors can be detected and measured reliably and consistently. This invention provides a simple yet reliable method to compensate for these factors to accurately classify an occupant and determine the occupant's weight.

SUMMARY OF THE INVENTION

The present invention is directed to a novel integrated occupant sensing system. In accordance with the present invention, an integrated occupant sensing system provides: (i) an occupant classification according to the U.S. Federal Motor Vehicle Safety Standard No. 208, (ii) a child seat, or an inanimate occupant, detection, and (iii) a weight approximation of the occupant.

In accordance with the preferred embodiment of the present invention, the occupant classification module and the child seat/inanimate object detection module comprise: (a) one or more sensors mounted inside or under the seat cushion to determine the amount of load or pressure applied on the seat, and, if desired, (b) one or more occupant presence detection (OPD) type of sensors to decide on whether or not the occupant is animate or not. The use of the OPD is to provide the system with the ability to distinguish animate and inanimate occupants. Such a feature may or may not be integrated, depending on the end user requirements.

As for the occupant's weight estimation module, it comprises: (a) a head tracking sensor that can give real-time x-y coordinates of the occupant's head in the horizontal plane, (b) a seat back inclination sensor to determine the seat back inclination angle, and (c) a seat track position sensor to determine a one-dimensional coordinate of the seat position relative to any point on the seat track, in addition to the sensors mentioned above and which are used for the occupant classification module and the child seat/inanimate object detection module. The same OPD remark applies to the weight estimation system.

The present invention has no restrictions on the type of sensors to be used. Any type of sensors can be used as long as it provides the system with the information it is supposed to provide it with.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
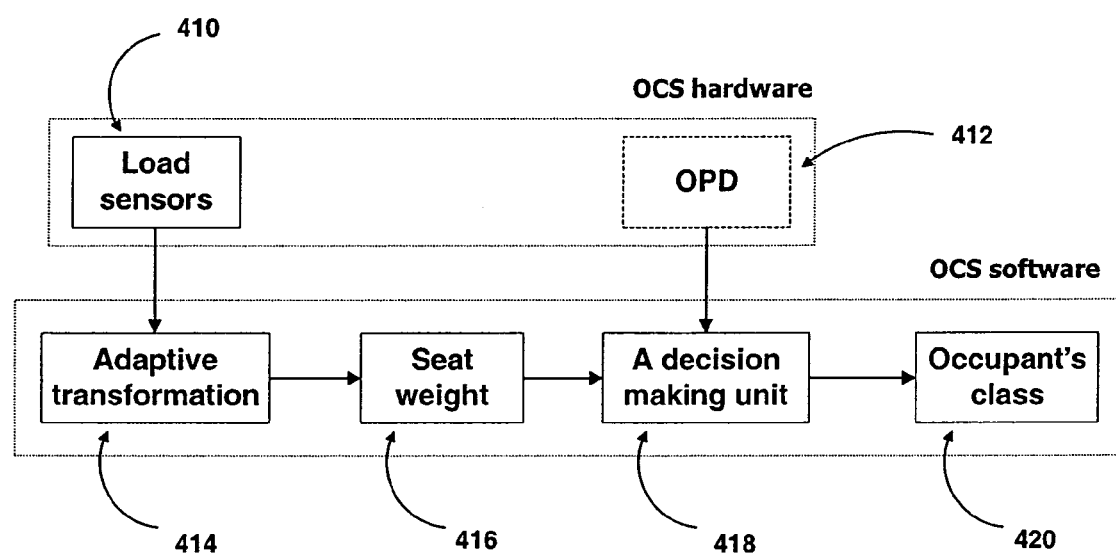
FIG. 1 is a schematic block diagram of the occupant classification system (OCS)

Referring to FIG. 1, an occupant classification system (OCS) includes one or more load sensors 410 mounted inside or under the seat cushion to determine the amount of load or pressure applied on the seat. Any sensors that meet these specifications may be used. The OCS may also comprise one or more occupant presence detection (OPD) type of sensors 412 to decide on whether or not the occupant is human. Again, there are no restrictions on the type of sensors to be used for this purpose, but one type of a suitable OPD sensor 412 is a sensor for detecting the capacitance of a human on the seat, such as is disclosed in co-pending application U.S. Ser. No. 10/319,431 filed Dec. 13, 2002 entitled "Occupant Presence Detection Device," which is hereby incorporated by reference in its entirety. It is worth stressing the fact that the OCS may work with or without the OPD sensor 412. In other words, the OPD sensor 412 is necessary only if the distinction between animate (e.g. human) and inanimate (e.g., child seat) occupants is needed.

Given the amount of load or pressure detected by the load sensors 410, an adaptive transformation module 414 is then used to map that reading, which can be in any unit such as a voltage for instance, to its equivalent mass or weight value. This transformation may be either linear or nonlinear depending on the seat dynamics and load sensor(s) mounting configuration. A nonlinear transformation may be realized by a number of possible computational intelligence tools such as fuzzy logic, artificial neural networks, and/or a combination of both. The output of this adaptive transformation module 414 provides an approximation of the load applied onto the seat, i.e., seat weight 416. Finally, a decision-making unit 418 takes the estimated seat weight 416 and the outcome of the occupant presence detection sensor 412 as inputs and decides on the right class of the occupant according to the U.S. Federal Motor Vehicle Safety Standard No. 208.

Figure 2:
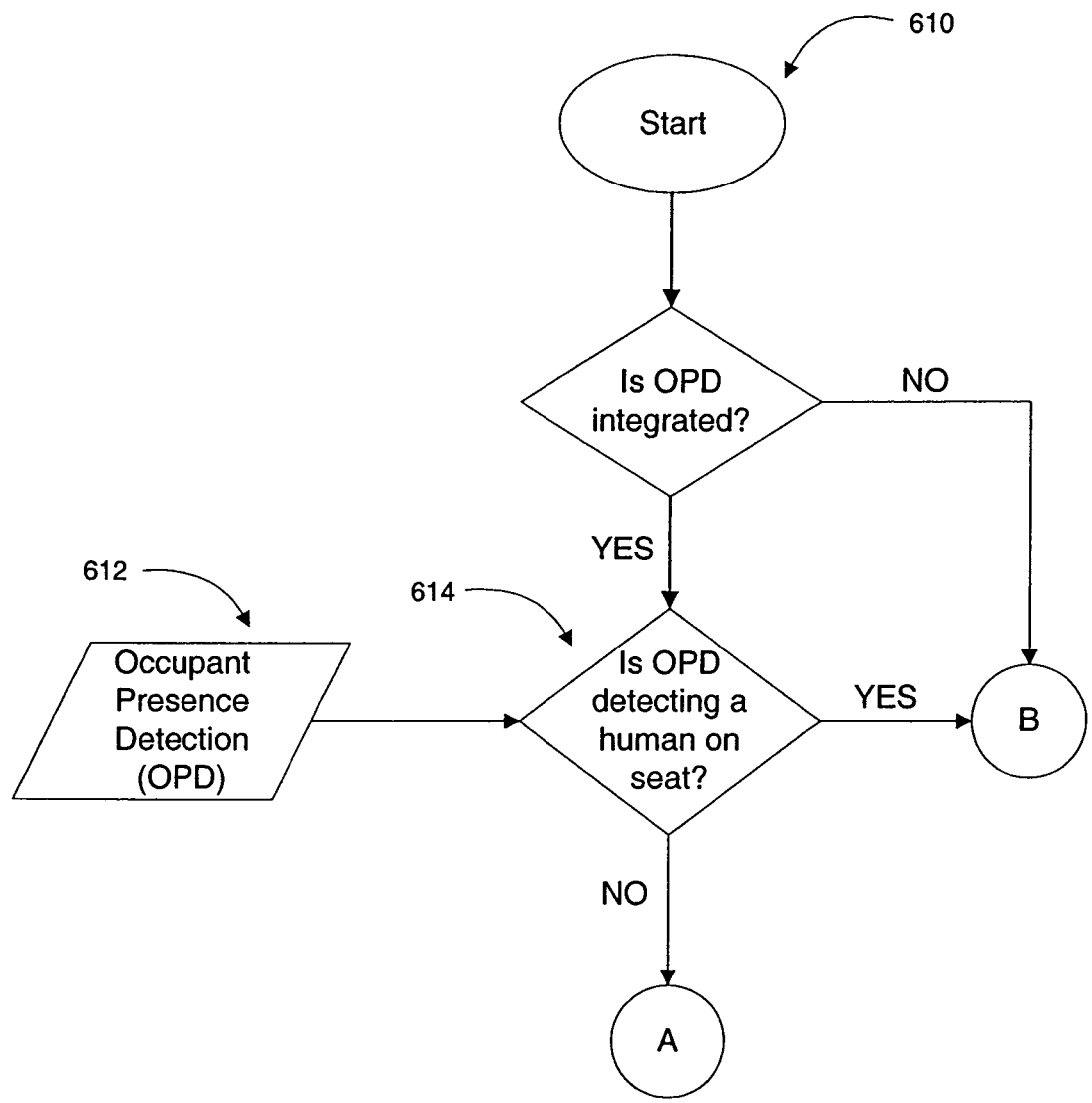
FIG. 2 is a flowchart of the first steps in the occupant classification algorithm.

FIG. 2 provides a flowchart showing the first algorithmic steps in the occupant classification system, which is about deciding whether the occupant is human or not in case an OPD 612 is integrated in the OCS. In case an OPD 612 is not integrated, then all occupants are implicitly considered as animate objects. In other words, the 'Child Seat' class, for example, would not be considered and it would be merged with the 'Child' class. If the OPD 612 detects an occupant as non-human, the system goes into the child seat detection mode, mode A; otherwise it enters the animate occupant classification mode, mode B. This whole process is repeated infinitely.

Figure 3:
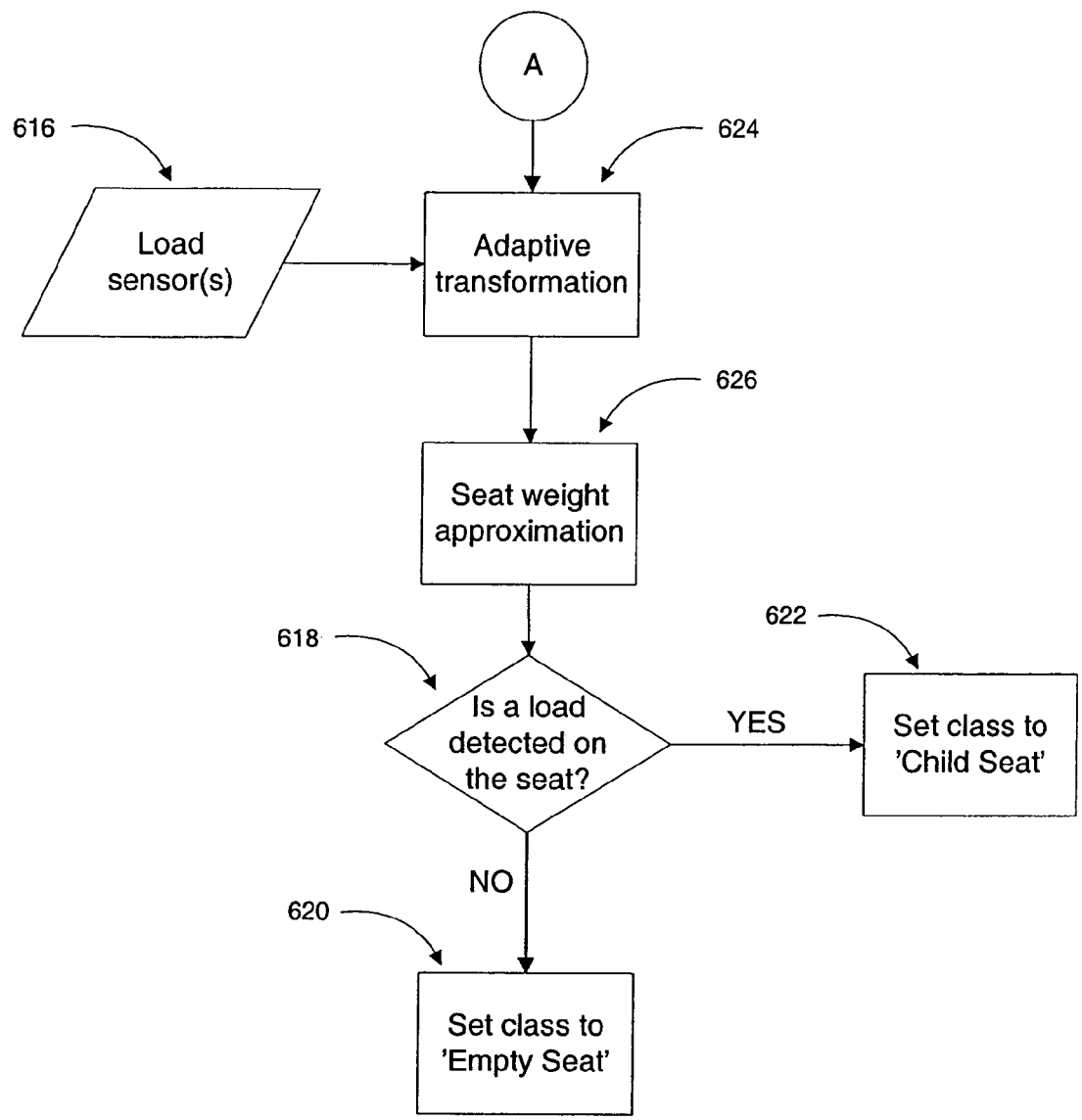
FIG. 3 is a flowchart of the child seat detection algorithm.

The child seat detection algorithm, the flowchart of which is shown in FIG. 3, is based on the fact that since it is already detected that there is no animate occupant on the seat, there remain two possibilities to check. The first is the case where the seat is empty. This is verified if the estimated load applied on the seat 626 is within the empty seat weight range. If so, then the seat is ruled to be empty, otherwise the system concludes that a child seat is on board.

Figure 4:
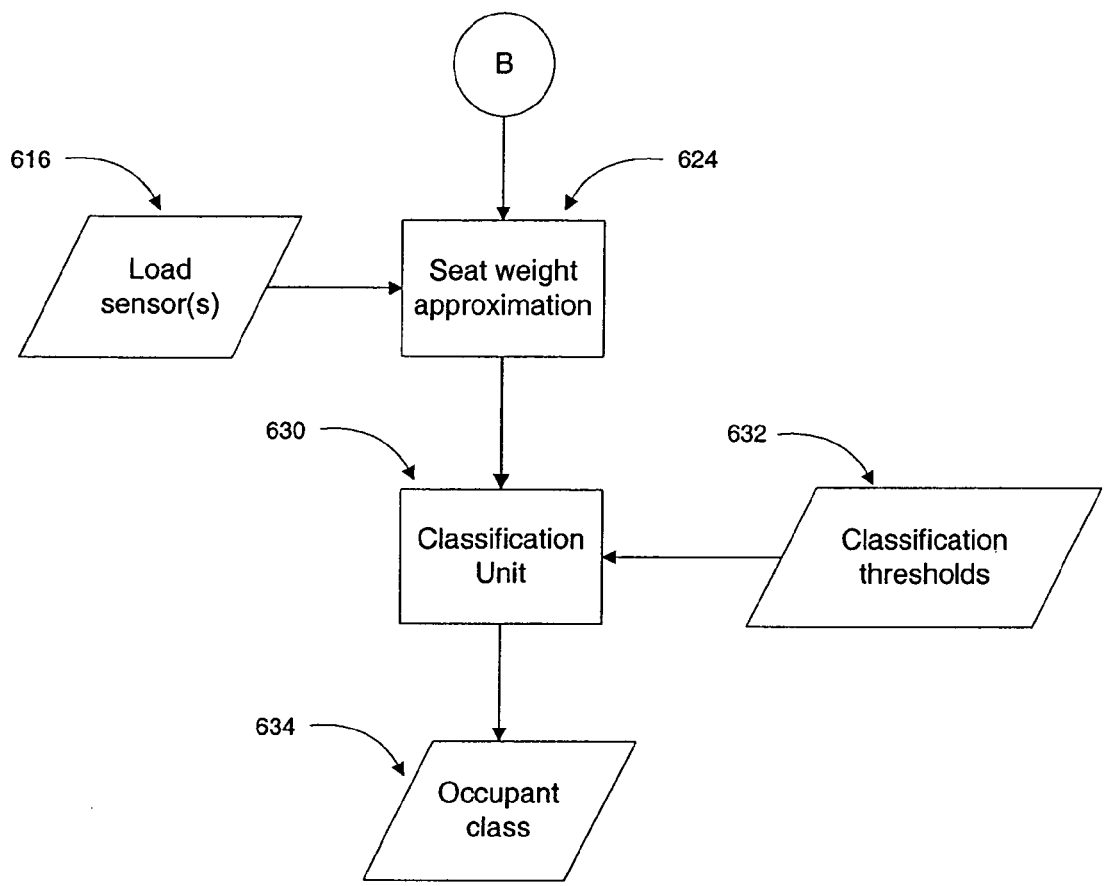
FIG. 4 is a flowchart of the animate occupant classification algorithm.
Figure 5:
FIG. 5 schematically depicts an example of using various thresholds to discretize the seat weight space into several occupant classes.

The flowchart depicting the animate occupant classification module is shown in FIG. 4. The inputs to this module are the seat weight approximation 624 and the classification thresholds 632. The overall possible seat weight range is divided into several subspaces according to the occupant class thresholds 632. An example of such a fragmentation is given in FIG. 5. Obviously, the number of weight ranges and the width of each weight range may be tuned according to the preferences of the end user.

Figure 6:
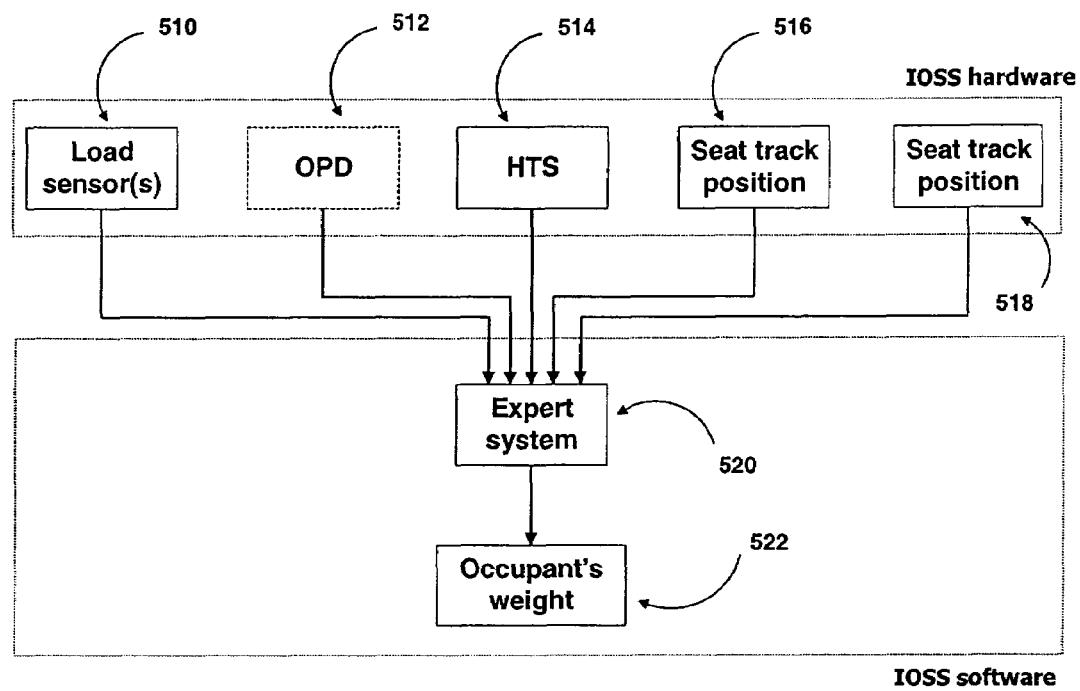
FIG. 6 is a block diagram of the integrated occupant sensory system (IOSS).

FIG. 6 reveals the flowchart of the integrated occupant sensory system (IOSS). The inputs to this system are the reading of the load sensor 510, the x-y coordinates of the occupant's head in the horizontal plane as tracked by the head tracking system (HTS) 514, the seat back inclination angle as detected by the seat back inclination sensor 518, the outcome of seat track position sensor 516, and the decision of the occupant presence detection sensor 512, in case it is integrated in the system. The HTS 514 may comprise an array of capacitance sensors, such as disclosed in U.S. Pat. No. 6,552,550 and in co-pending application U.S. Ser. No. 10/161,021, entitled "THREE DIMENSIONAL OCCU-PANT POSITION SENSOR," filed Jun. 3, 2002, which are hereby incorporated by reference in their entirety.

These values are passed to an expert system 520 in which they undergo several nonlinear transformations leading to the occupant's approximated weight 522. The main role of the expert system 520 here is to capture the non-linearities governing the input space mapping to the output space. It can be any tool that is capable of achieving this requirement. Some possible widely used tools for such applications are artificial neural networks, fuzzy logic inference engines, genetic algorithms, or any combinations of them. The occupant presence detection sensor 512 is used in this algorithm only to differentiate an animate from an inanimate occupant. This is to know which set of nonlinear transformations are needed to be carried out by the expert system 520 as they are different. For example, a major difference between the two cases is that for a human occupant the expert system 520 has to compensate for the loss of information stemming from the feet touching the floor, for instance. In other words, in this case the seat weight does not reflect the actual weight of the occupant. This is mainly where the head tracking system (HTS) 514, the seat back inclination sensor 518, and the seat track position sensor 516 come to play. The particular details of the expert system 520 will depend on the structure of the seat and the particular sensors 510, 512, 514, 516, 518 utilized, but one of skill in the art could program the expert system based upon the specific details involved in the particular system.

Figure 7:
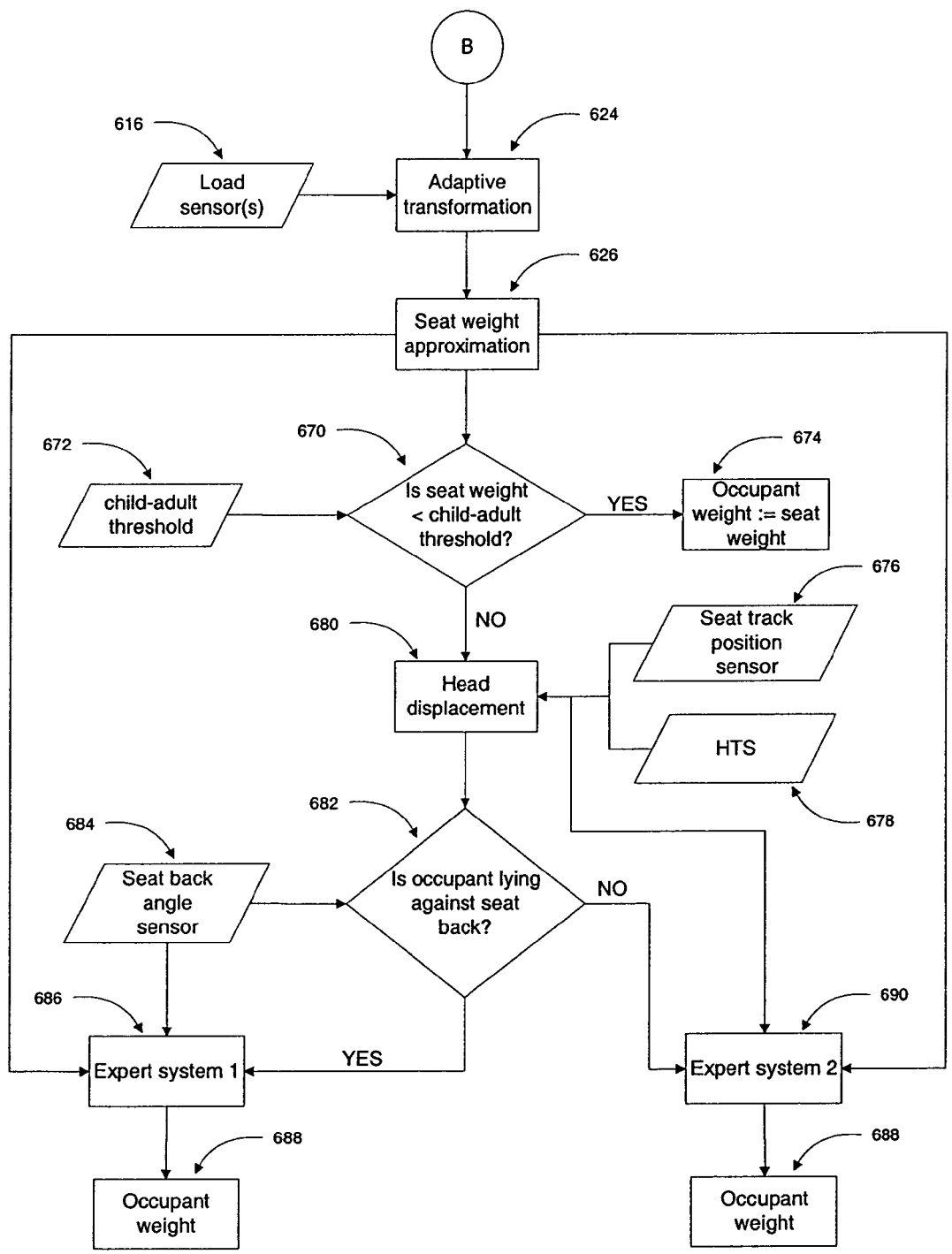
FIG. 7 shows a flowchart of module B of the IOSS.

The IOSS flowchart is similar to that of the OCS one except for module B. The flowchart of the IOSS version of this module is shown in FIG. 7. Once the seat weight approximation 626 is computed, it is compared to a child-adult threshold 672, which is supposed to separate 5th percentile female seat weights from those of 6 year-old occupants as defined in the U.S. Federal Motor Vehicle Safety Standard No. 208. In the case of 6 year-old occupants and younger there is not much offloading involved as the occupant's feet are less likely to touch the vehicle floor. Even when they do, the offloading is usually minor. Based on this observation, the occupant weight is set to the approximated seat weight in this case. The real challenge in this system is to estimate the weights of occupants who are at least as heavy as a 5th percentile female. For this, the occupant head displacement 680 is computed. The occupant head displacement, in this context, stands for the displacement of the head in the horizontal plane with respect to the occupant's posteriors coordinates when orthogonally projected onto that plane. This measure provides an idea on the degree of inclination of the occupant's upper torso. The computation of the occupant head displacement is performed using the seat track position and the occupant's head coordinates in the horizontal plane as provided by the seat track position sensor 676 and the HTS 678, respectively. The system then uses the head displacement in addition to the seat back angle, read from the seat back angle sensor 684, to decide whether or not the occupant is lying against the seat back. It is important to know this piece of information, as the system's nonlinear dynamics is highly dependent on whether or not the occupant is laying against the seat back. If the occupant is indeed lying against the seat back, then the system's dynamics depends on the seat back angle and the estimated seat weight but not on the head coordinates nor on the seat track position. In this case, the occupant weight 688 is approximated by expert system 1 686, which takes those two parameters as inputs. If the occupant is not lying against the seat back, then the system's dynamics depends on the seat track position, the head coordinates in the horizontal plane, and the estimated seat weight, but not the seat back angle. In this case, the occupant weight is approximated using expert system 2 690, which takes those three parameters as inputs. Several types of expert systems may be used for this purpose. For instance, fuzzy logic engines, artificial networks, and/or any combination of both are good candidates for such applications as they are credited for their high online capabilities in approximating nonlinear mappings like the ones governing the input space to the output space of the weight estimation problem in hand.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. An occupant classification system comprising:
   at least one load sensor for determining a weight of a load on a vehicle seat; and
   at least one occupant presence detection (OPD) sensor for determining whether the load is an animate occupant based upon a capacitance of the load, wherein the system determines that a child seat is present on the vehicle seat based upon the at least one load sensor determining the weight of the load on the vehicle seat exceeds an empty seat threshold and based upon the OPD sensor indicating that no animate occupant is present.

2. The occupant classification system of claim 1 further including a head-tracking system (HTS) for determining a position of a head of an occupant of the vehicle seat.

3. The occupant classification system of claim 2 wherein the HTS determines the position of the head in a horizontal plane, and wherein the occupant classification system calculates a weight of the occupant based upon the position of the head of the occupant as determined by the HTS, the load on the vehicle seat as determined by the at least one sensor and the OPD sensor.

4. The occupant classification system of claim 3 wherein the HTS includes an array of capacitive sensors.

5. The occupant classification system of claim 3 wherein the system compares the position of the head to a position of the vehicle seat to determine an inclination of the occupant.

6. The occupant classification system of claim 5 wherein the system determines the weight of the occupant based upon the inclination of the occupant.

7. The occupant classification system of claim 6 wherein the system further includes a seat back angle sensor, and wherein the system determines the weight of the occupant based upon the angle of the seat back compared to the inclination of the occupant.

8. The occupant classification system of claim 7 wherein the system determines whether the occupant is lying against the seat back based upon the angle of the seat back and based upon the inclination of the occupant.

9. A method for classifying an occupant of a vehicle seat including the steps of:
   a) determining whether a load on the vehicle seat exceeds an empty seat threshold;
   b) measuring a capacitance of the load on the vehicle seat;
   c) determining whether the load on the vehicle seat is animate or inanimate based upon the capacitance measured in said step b); and
   d) determining that a child seat is present based upon a determination in said step a) that the load exceeds the empty seat threshold and a determination in said step c) that the load is inanimate.

10. The method of claim 9 further including the step of:
    e) determining a weight of an occupant based upon said steps a) and d).

11. The method of claim 10 further including the step of:
    f) tracking a position of a head of the occupant of the vehicle seat.

12. The method of claim 11 wherein said step d) further includes the step of determining the weight based upon said step f).

13. A method for classifying an occupant of a vehicle seat including the steps of:
    a) measuring a load on the vehicle seat;
    b) determining a position of a head of an occupant of the vehicle seat; and
    c) classifying the occupant based upon said steps a) and b).

14. The method of claim 13 further including the step of:
    d) determining whether the occupant is lying against a back of the vehicle seat, wherein said step c) further includes the step of classifying the occupant based upon said step d).

15. The method of claim 13 further including the step of:
    determining an angle of inclination of the occupant based upon said step b), said step c) further including the step of classifying the occupant based upon the angle of inclination.

16. The method of claim 15 further including the step of determining a weight of the occupant based upon the angle of inclination.

17. The method of claim 16 further including the step of determining whether the occupant is in a child seat based upon the angle of inclination.

18. The method of claim 13 wherein in said step b) the position of the head of the occupant is determined independently of a position of a lower torso of the occupant on the vehicle seat.

19. The method of claim 13 wherein said step b) further includes the step of using a capacitive sensor to determine the position of the head.

20. The method of claim 13 wherein said step b) further includes the step of determining the position of the head of the occupant relative to the vehicle, independently of the position of the vehicle seat.

21. A method for classifying an occupant of a vehicle seat including the steps of:
    a) determining a position of a head of an occupant of the vehicle seat;
    b) determining an angle of inclination of a seat back of the vehicle seat; and
    c) determining whether the occupant is leaning against the seat bank based upon said steps a) and b).

22. The method of claim 21 further including the step of:
    d) measuring load on the vehicle seat;
    e) determining a weight of the occupant based upon said steps c) and d).

23. The method of claim 22 further including the step of compensating for the occupant leaning against the seat back in the determination of the weight of the occupant in said step e).

24. The method of claim 21 further including the step of determining a weight of the occupant based upon the angle of inclination.

25. The method of claim 21 wherein in said step 1) the position of the head of the occupant is determined independently of a position of a lower torso of the occupant on the vehicle seat.

* * * * *

UNITED STATES PATENT AND TRADEMARK OFFICE
CERTIFICATE OF CORRECTION

PATENT NO. : 7,088,113 B2 Page 1 of 1
APPLICATION NO. : 10/615581
DATED : August 8, 2006
INVENTOR(S) : Basir et al.

It is certified that error appears in the above-identified patent and that said Letters Patent is hereby corrected as shown below:

Claim 21, Column 6, line 49: "bank" should be --back--

Signed and Sealed this

Fourteenth Day of November, 2006

JON W. DUDAS
*Director of the United States Patent and Trademark Office*